March 2, 1954     F. C. REGGIO     2,670,724
ENGINE REGULATING SYSTEM
Filed Nov. 20, 1944     4 Sheets-Sheet 1

Fig. 1

Inventor
F. C. Reggio

March 2, 1954     F. C. REGGIO     2,670,724
ENGINE REGULATING SYSTEM
Filed Nov. 20, 1944     4 Sheets-Sheet 4

Inventor
F. C. Reggio

Patented Mar. 2, 1954

2,670,724

UNITED STATES PATENT OFFICE 2,670,724

ENGINE REGULATING SYSTEM

Ferdinando Carlo Reggio, Buffalo, N. Y.

Application November 20, 1944, Serial No. 564,379

47 Claims. (Cl. 123—25)

This invention relates to engine regulating systems, and more particularly to mechanisms for automatically controlling one or more engine operative adjustments upon changes of one or more preselected variables or parameters. The invention is particularly useful in connection with aircraft engines and other automotive powerplants.

Aside from mechanical limitations, the maximum power output of an internal combustion engine is limited by conditions resulting from the high temperature of combustion, such as detonation; and the detonation limit for a given fuel is in turn dependent upon the cylinder compression ratio, the fuel-air ratio of the combustible mixture, the spark advance and other engine operative conditions including the induction and cylinder temperatures and the exhaust pressure.

Other conditions being equal, the lower the compression ratio, the higher the boost pressure which the engine can withstand without detonation. On the other hand, the engine thermal efficiency may be considerably improved by increasing said ratio. Accordingly, aircraft engines designed for high specific power output have moderate compression ratio and consequently comparatively poor fuel economy; while engines designed for transcontinental or transoceanic flights, where low fuel consumption under cruising operation is a primary requisite, are designed with higher compression ratio.

One of the objects of the invention is to provide a simple device for the automatic regulation of the engine cylinders compression ratio while the engine is operating, whereby high specific power output may be obtained at take-off together with high fuel economy under cruising conditions.

Another object is to provide a regulating system for automatically and simultaneously adjusting one or more engine operative conditions such as the compression ratio, the fuel-air ratio of the combustible mixture, the ignition timing, the injection of water or other anti-knock fluid, the manifold pressure, or the engine fuel supply, or the maximum engine boost, upon changes of preselected variables or parameters.

A further object is to provide means for automatically correcting the engine operative adjustments when detonation occurs.

Other objects and advantages will be more particularly pointed out hereinafter or will become apparent as the description proceeds.

In the accompanying drawings, in which like reference numerals are used to designate similar parts throughout, there are illustrated suitable mechanical embodiments for the purpose of disclosing the invention. The drawings, however, are for the purpose of illustration only and are not to be taken as limiting or restricting the invention since it will be apparent to those skilled in the art that various changes in the illustrated construction may be resorted to without in any way exceeding the scope of the invention, as defined by the claims.

Figure 1:
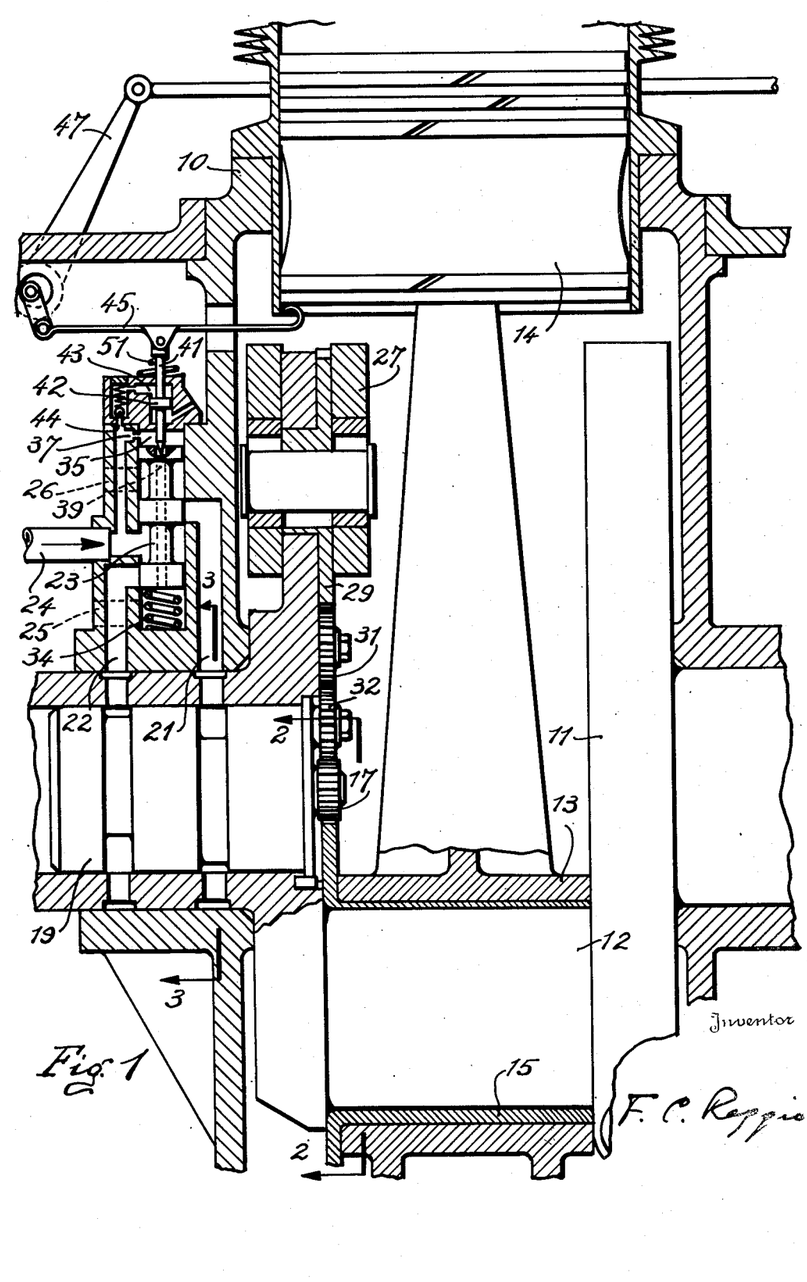
Figure 1 is a longitudinal sectional view through an engine constructed according to the invention.
Figures 2, 3, 4, 5:
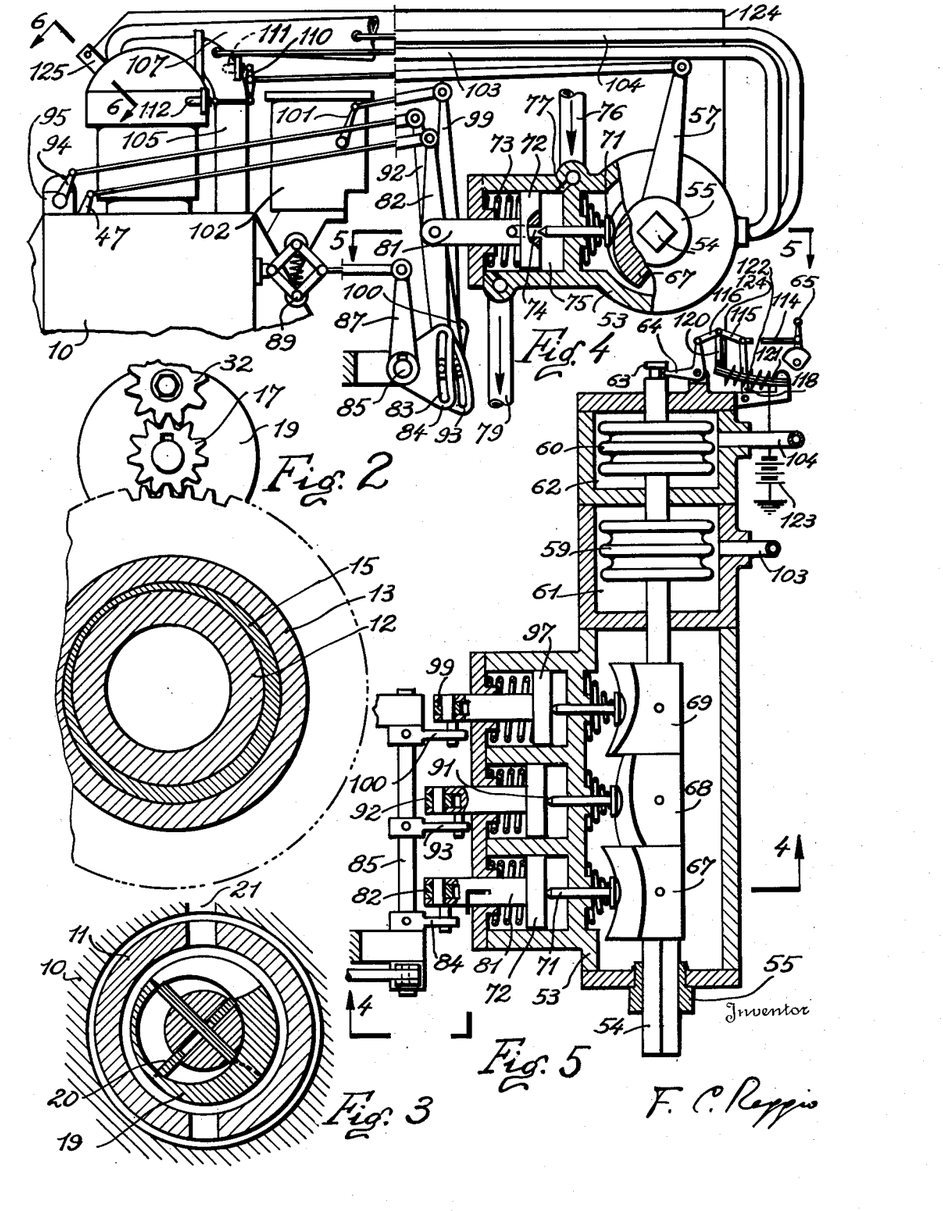
Figures 2 and 3 are fragmentary sections taken along the lines 2—2 and 3—3 of Figure 1, respectively.
Figure 4 shows in side elevation an example of regulating system embodying the invention.
Figures 5 and 6 are sections taken along the lines 5—5 and 6—6 of Figure 4, respectively.

Referring to the drawings in detail, the numeral 10 indicates an engine, shown as a conventional radial aircraft engine, provided with a crankshaft 11 having a crankpin 12, a master rod 13 connected to the piston 14, and other rods, not shown, connected with the master rod 13. An eccentric sleeve 15 is loosely mounted between the crankpin 12 and the master rod bore, and is provided with a flat circular plate having peripheral teeth which mesh with a pinion 17 coaxial with the crankshaft journals. This pinion is keyed to the shaft of a reversible rotary servomotor 19 which is secured within an axial bore of the crankshaft journal. This servomotor is shown in Figures 1 and 3 as a hydraulic servomotor having vanes 20 operating in an eccentric chamber connected on diametrally opposite sides through ducts formed in the journal with conduits 21 and 22 controlled by a slide valve 23; the arrangement being such that when the valve is in neutral position as shown in the drawings the pinion 17 is hydraulically locked with respect to the crankshaft, and the eccentric sleeve 15 rotates with the crankpin 12 as if it were rigidly attached thereto. Upward displacement of the valve 23 connects the conduits 21 and 22 with a high pressure oil line 24 and with a drain line 25, respectively, causing rotation of the servomotor pinion 17 and of the eccentric sleeve 15 in such directions as to increase the effective crank radius, the stroke of the pistons 14 and the compression ratio of the various engine cylinders. Conversely, upon downward displacement of the valve 23 the conduits 21 and 22 are connected with a drain line 26 and the high pressure line 24, respectively, and the servomotor turns the sleeve 15 relatively to the crankpin 12 in the direction to decrease the effective crank radius and the cylinder compression ratio.

The crankshaft 11 may be provided with dynamic counterweights 27 whose distance from the axis is dependent upon the angular adjustment of an eccentric sleeve 29, rotatably mounted in the crankshaft cheek and provided with peripheral teeth meshing with idler gears 31 and 32 driven from the servomotor pinion 17, whereby the effective radii of the crankpin 12 and counterweights 27 are simultaneously altered so as to preserve the balance of the rotating and reciprocating engine system.

A compression spring 34 at the lower end of the pilot valve 23 exerts an upward load thereon. A chamber 35 at the upper end of the valve 23 is in constant communication with the high pressure oil conduit 24 through a small orifice 37. An axial bore 39 formed in the pilot valve 23 connects the pressure chamber 35 with the drain line 25, and the open area of this bore or port 39 is controlled by a slidable needle valve 41 coaxial therewith. The latter valve is provided with a small piston 42 defining a dash-pot chamber 43 to which oil is admitted from the high pressure oil line 24 through a port 44 controlled by a spring-loaded valve.

The upper end of the needle valve 41 is connected with an intermediate point of a floating lever 45 formed with light flat spring material, the outer end of which lever may be moved up or down by rotating a control lever 47, while the opposite or inner end of lever 45 is adapted to come into contact with the piston 14 when the latter is in its lowest or bottom dead center position. A spring 51 exerts an upward load on the needle valve 41 tending to lift the latter as well as the inner end of lever 45. The velocity of these upward motions, however, is limited to a very small value corresponding to the leakage of oil from the dash-pot 43. On the other hand the downward motion of the needle valve 41 is not damped, since the suction determined by piston 42 lifts the valve controlling port 44 and causes admission of oil to the dash-pot 43.

The compression ratio regulating device shown in Figures 1, 2 and 3 operates as follows: with the engine revolving, when piston 14 attains its bottom dead center position it is in contact with lever 45. This contact lasts only a very short time, and as the piston moves upward, owing to the load of spring 51 and the dampening action of the dash-pot 43 the inner end of lever 45 moves upward at low velocity until, after completion of one engine revolution, piston 14 again comes in contact with lever 45 and brings it back to its original position, thus determining downward motion of piston 42, opening of valve 44 and admission of oil to the dash-pot 43. It is thus apparent that with the engine in motion the inner end of lever 45 has a pulsating or reciprocating motion of very small amplitude, and in substance its position indicates the bottom dead center position of piston 14.

The lower end of the needle valve 41 controls the open or effective flow area of the drain conduit 39 formed in the pilot valve 23. In normal operation the pilot valve 23 is in neutral position; and the relative axial adjustment of pilot valve 23 and needle valve 41 and in turn the effective area of the drain conduit 39 are such as to maintain in chamber 35 the proper oil pressure to balance the load of spring 34.

If this condition of equilibrium of the pilot valve in its neutral position is disturbed—for example, by rotating the lever 47 counter-clockwise and thus causing downward motion of the outer end of lever 45, the needle valve 41 moves downward, decreases the effective area of the oil discharge orifice 39 while the admission orifice 37 remains unchanged, and the oil pressure in chamber 35 rises; whereupon the pilot valve 23 moves downward and sets the servomotor 19 in motion so as to rotate the eccentric sleeve 15 relatively to the crankpin 12 in the direction to decrease the effective crank radius thereof. As a result, both the stroke of the engine pistons 14 and the compression ratio of the engine cylinders are caused to decrease; and the inner end of lever 45, following the variation of the bottom dead center position of piston 14, will move upward and lift the needle valve 41. This will in turn determine an increase of area of the discharge orifice 39, a drop of oil pressure in chamber 35, and upward motion of the pilot valve 23. Rotation of the servomotor 17 and consequent decrease of cylinder compression ratio and upward motion of the needle valve 41 and pilot valve 23 continues until the latter valve returns to neutral position.

Conversely, clockwise rotation of lever 47 lifts the outer end of lever 45 and the needle valve 41, causes upward motion of the pilot valve 23, starts the servomotor gear 17 and determines rotation of the eccentric sleeve 15 relative to the crankpin 12 in a direction to increase the crank radius and in turn increase the stroke of the engine pistons and the compression ratio of the cylinders. As a result, the bottom dead center position of piston 14 moves downward, causing downward motion of the inner end of lever 45, of the needle valve 41 and pilot valve 23; and the operation of the servomotor does not stop until the latter valve 23 resumes its neutral position. The engine compression ratio may thus be regulated while the engine is operating by means of the control lever 47, and may assume any desired value within the designed limits.

Figures 6, 9:
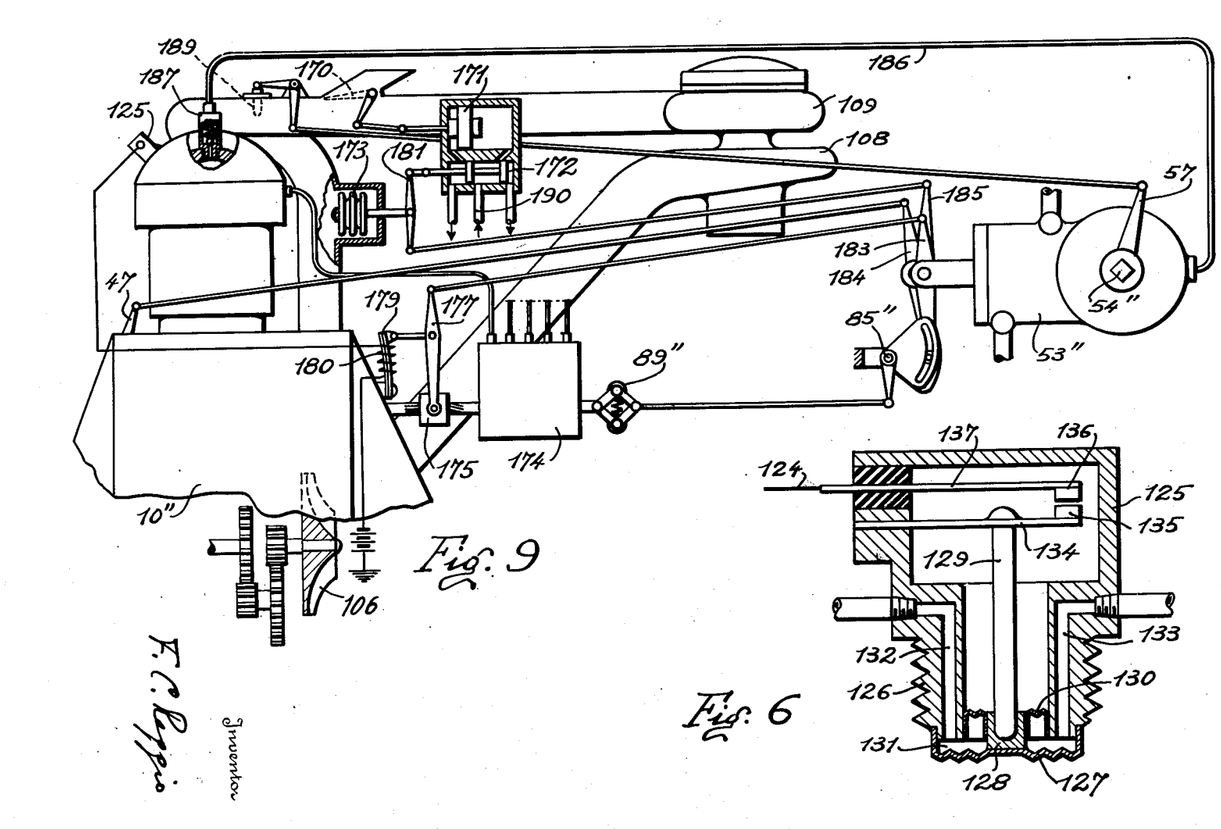
Figures 7 and 9 show in side elevation two further examples of embodiment of regulating systems according to the invention.

Figures 4, 5 and 6 indicate one of the preferred embodiments of engine regulating system according to the invention. This includes a regulator having a housing 53 and a shaft 54 therein, formed with a non-circular or splined end slidable in a sleeve 55 which is rotatably mounted in the cover of housing 53 and is provided with a lever 57 which serves to control the angular adjustment of the shaft. This shaft 54 is connected with two expansible pressure responsive bellows 59 and 60 which are coaxial therewith and enclosed within sealed housings 61 and 62, respectively. The far end of the latter bellows is secured to a shaft element 63 which extends through a bore formed in the cover of housing 62 and which is provided with an annular groove engaged by one end of a bell-crank lever 64 linked to a remote control member such as a pilot lever 65. Three warped cams 67, 68 and 69 are secured to the shaft 54, and the whole shaft assembly including cams, bellows and element 63 are rotatable with lever 57, while the axial adjustment of the shaft 54 and of the three warped cams is dependent upon the setting of the pilot lever 65 and the pressures within the bellows housings 61 and 62.

The slidable and rotatable warped cam 67 actuates a spring loaded needle valve 71 slidably mounted in the end wall of a hydraulic cylinder including a power piston 72 loaded by a spring 73, provided with a discharge conduit 74 coaxial with the valve 71, and actuated by the pressure oil in chamber 75. Oil is admitted to chamber 75 from a high pressure oil line 76 through a calibrated orifice 77, and is drained therefrom through the conduit 74 whose effective open area is dependent upon the relative axial adjustment of the needle valve 71 and power piston 72; and through the low pressure return line 79. The power piston 72 is actuated by the needle valve 71 in the same manner as the pilot valve 23 shown in Figure 1 is controlled by the needle valve 41; that is to say, upon motion of the needle valve 71 toward the left or the right, owing to the variation in the effective area of the discharge orifice 74 the oil pressure in chamber 75 increases or decreases, respectively, causing the power piston to follow the motions of the valve 71.

The power piston 72 is provided with a rod 81 connected with an intermediate point of a floating lever 82 the lower end of which carries a pin engaging a slot 83 formed in a cam 84 secured to a shaft 85. The angular adjustment of this shaft is controlledl by a lever 87 actuated by centrifugal flyballs 89 driven from the engine 10 and is therefore dependent upon the engine speed. The upper end of lever 82 is connected to the compression ratio control lever 47.

A second power piston 91, similar to piston 72, is actuated from the warped cam 68 and is connected with an intermediate point of a second floating lever 92 whose lower point is controlled through a pin and slot connection by a cam 93 secured to the shaft 85. The upper end of lever 92 is connected with the ignition timing control lever 94 which angularly adjusts the electrical circuit breaker of the magneto 95 or other equivalent spark timing control device, and can be rotated clockwise to advance the spark or counterclockwise to retard the spark.

A third power piston 97, actuated from cam 69, controls an intermediate point of lever 99 whose lower end is adjusted through a pin and slot connection by a cam 100 carried by the shaft 85. The upper end of lever 99 actuates a fuel-air mixture ratio control lever 101 which may be provided in connection with the engine fuel injection control system in case of an injection engine or, as shown in Figure 4, with the engine carburetor 102. Counter-clockwise rotation of lever 101 increases the fuel-air ratio.

The sealed bellows housing 61 and 62 are connected by means of conduits 103 and 104 with the engine induction manifold 105 and with the exhaust manifold 107, respectively. Where the engine is provided with an exhaust-driven turbo-supercharger 108 as shown in Figure 9, this exhaust manifold 107 is used to lead the exhaust fluid to the turbine 109 driving the first stage supercharger 108. A conventional gear-driven supercharger, as shown at 106 in Figure 9, may be provided in the engine 10, between the carburetor 102 and the manifold 105.

The lever 57 of the regulator is connected with a floating lever 110 whose upper and lower ends are actuated by a manifold or intake charge temperature responsive element 111, and by a cylinder temperature responsive element 112, respectively, whereby an increase of either temperature causes clockwise rotation of lever 57, as shown in Figure 4, and cams 67, 68 and 69.

The linkage connecting the pilot lever 65 with the bell-crank lever 64 includes rod elements 114, 115 and 116. The pivot between elements 114 and 115 is guided by a lever 118 rotatably mounted on the cover of housing 62; while the pivot between element 115 and 116 is connected with one end of lever 120 whose opposite end is carried by the free extremity of a bimetallic strip 121 surrounded by a heating coil 122 and so designed as to deflect upward when heated. The coil is connected with a storage battery 123 and, through the conductor 124, with a contact included in the detonation detector 125 mounted on the head of one of the engine cylinders.

The detonation detector includes a housing having a threaded portion 126 adapted to be screwed in a tapped bore provided in the cylinder head of one of the engine cylinders, and is provided with a flexible diaphragm 127 secured to the lower end thereof and so designed as to come flush with the combustion chamber surface and be exposed to the pressure within the cylinder. A thrust element 128 having an axial cavity adapted to receive one end of a light pin 129 is electrically welded to the center of diaphragm 127; and a second flexible diphragm or bellows 130 is secured to the thrust element 128 and to the body 126 in such a manner as to define a chamber 131 which is oil tight except for conduits 132 and 133 for the admission and discharge of a suitable liquid to cool the diaphragm 127.

The upper end of pin 129 is centered in a hemispherical cavity formed in a resilient conductor 134 attached at one end to the housing 125 which is connected to the ground through the engine cylinder. The opposite end of conductor 134 carries the movable element 135 of an electric contact, whose other element 136 is secured to a similar conductor 137 isolated from the housing 125 and connected with the conductor 124. The conductor 134 exerts a light axial load on the pin 129 tending to maintain the latter in contact with the thrust element 128.

The detonation detector 125 includes in substance a modified form of Dr. H. C. Dickinson's bouncing pin, a description of which may be found in the Journal of the Society of Automotive Engineers, vol. 10, No. 1, January, 1922, pages 7-11, entitled Methods of Measuring Detonation in Engines, by Thomas Midgley, Jr., and T. A. Boyd.

The detonation detector operates as follows: during normal combustion the pin 129 moves up and down very slightly due to its following the movement of the diaphragm 127 determined by normal pressure changes in the cylinder, and the distance between contact elements 135 and 136 is such that under this slight motion of the pin 129 the contact remains open, no current flows around the heating coil 122, the bi-metallic strip 121 remains flat, and the linkage elements 115 and 116 are substantially coaxial. But when detonation occurs the pin 129 is projected upward a noticeable distance from the thrust element 128, causes engagement of the contact elements 135 and 136, and determines flow of current through the heating coil 122; whereupon the bi-metallic strip 121 bends upward and throws the linkage elements 115 and 116 out of line as shown in Figure 5 and, for a fixed adjustment of the manual lever 65, determines clockwise rotation of the bell-crank lever 120 and axial displacement of shaft 54. Although two successive explosions are rarely exactly alike, the arrangement including the bi-metallic strip 121 and the heating coil 122 provides an integration of the fluctuations of the pin 129, that is to say of the length of time the contact points 135 and 136 are closed, and the deflection of the strip 121 provides an accurate measure of the intensity of detonation or rate of pressure rise within the cylinder.

It is therefore clear that owing to the axial and angular motions of the warped cams 67, 68 and 69 and to the rotation of cams 84, 93 and 100, the regulator 53 simultaneously regulates the cylinder compression ratio, the ignition timing and the fuel-air ratio as preselected functions of the adjustment of the pilot lever 65, the induction and exhaust pressures, the rate of cylinder pressure rise or intensity of detonation, the intake charge and cylinder temperatures, and the engine speed. The warped cams and the slots in the rotatable discs may be so designed as to obtain for each set of operating pressures, temperatures and speed predetermined optimum values of compression ratio, ignition timing and combustible mixture ratio. For example, where the operating pressures, temperatures and speed are those corresponding to normal cruising conditions, the regulator will maintain high compression ratio, large spark advance and lean mixture to insure optimum fuel economy. Upon increase of intake charge temperature and/or cylinder temperature, the ensuing rotation of the cams may decrease the compression ratio and/or retard the spark and increase the fuel-air ratio. If the engine power output is increased, the increase of engine speed, manifold pressure and operating temperatures cause rotation of the cams 84, 93 and 100 and axial and angular displacement of the warped cams 67, 68 and 69 to decrease the compression ratio, retard the spark and increase the fuel-air ratio. The lever 65 may be used to adjust the operative setting of the regulator in accordance with the octane rating or anti-detonating characteristics of the fuel employed, and is supplemented by the detonation detector 125. Should detonation occur, the bending of thermostatic strip 121 would cause sliding motion of the warped cams in the same direction as if caused by increase of manifold pressure. Obviously, the regulator may be designed for the automatic adjustment of compression ratio, spark advance and fuel-air ratio throughout the whole range of engine operative conditions, including starting and idling.

Figures 7, 8, 10:
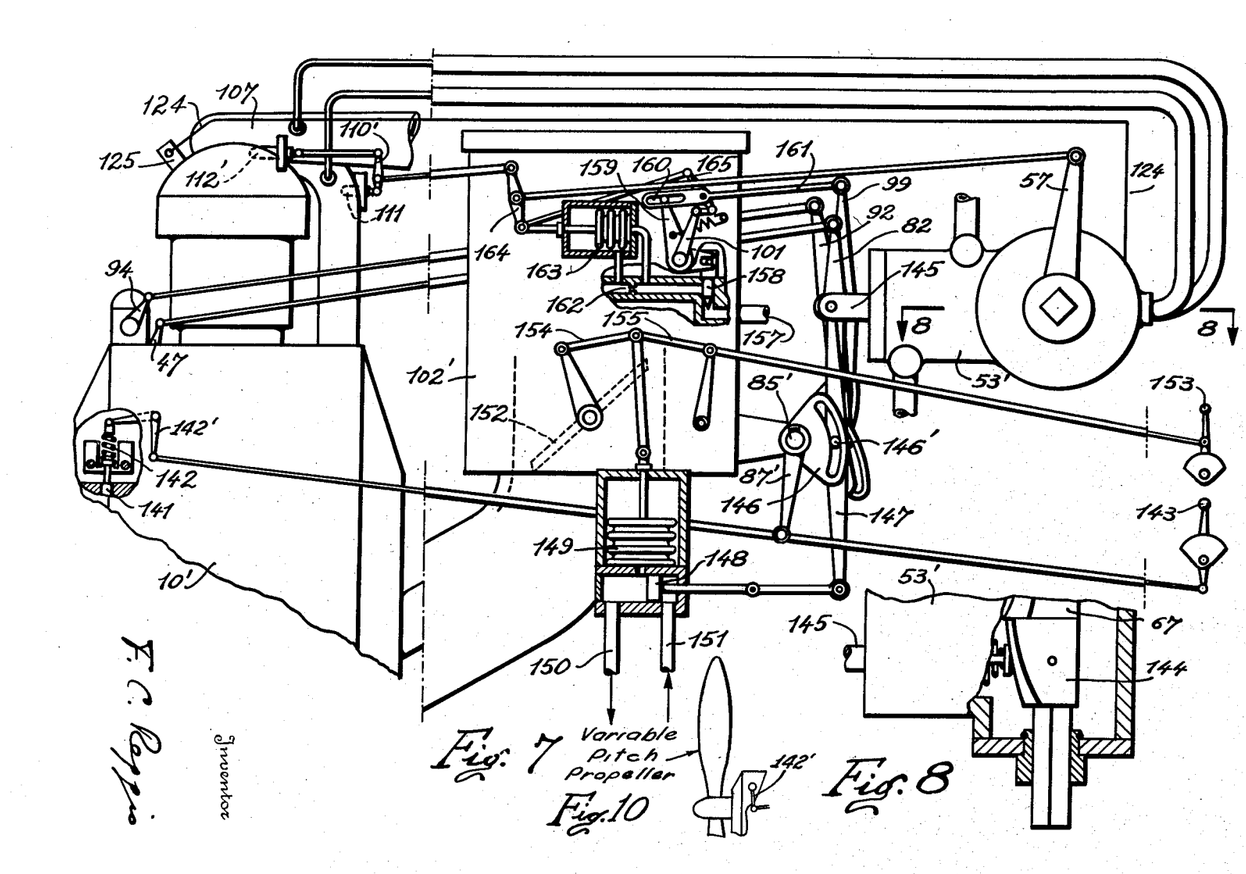
Figure 8 is a fragmentary section taken along the line 8—8 of Figure 7.
Figure 10 shows a variable pitch propeller which may be used in connection with the structure of Figure 7.

Figures 7 and 8 illustrate another example of embodiment of the invention. The aircraft engine 10' is provided with compression ratio, ignition timing and fuel-air ratio control levers 47, 94 and 101 respectively, as already set forth in detail, as well as with a variable pitch propeller, as diagrammatically indicated in Figure 10, whose pitch is regulated by a servomotor controlled by a pilot valve 141 actuated by an engine-driven governor including a spring 142. The load of this spring is adjusted by means of a lever 142' actuated by a manual lever 143 which serves to select the engine speed.

The regulator 53' is similar to the regulator 53 of Figures 4 and 5 except that it includes a fourth warped cam 144 actuating a power piston 145; and shaft 85' carries a fourth cam 146 and is linked by means of lever 87' to the engine speed control lever 143 and therefore is angularly adjusted in dependence upon the engine speed.

In addition to the three floating levers 82, 92 and 99, a fourth lever 147 is provided, connected at its upper end with the power piston 145 and carrying a pin 146' engaging a slot formed in cam 146. The lower end of lever 147 controls a servomotor comprising a pilot valve 148 which is adapted to connect the space within a resilient bellows 149 either with a low pressure oil line 150 or with a high pressure oil line 151.

The engine throttle 152 may be controlled automatically through a boost control, or it may be actuated from a manual lever 153 as shown in Figure 7. The throttle valve 152 is actuated through a linkage including elements 154 and 155 whose common pivot point is connected with the free end of the servomotor bellows 149 in such a manner that when this bellows is in contracted position as shown in Figure 7 the elements 154 and 155 are almost coaxial; while upon motion toward the left of the pivot valve 148 connecting the high pressure oil line 151 with the space within the bellows 149, the latter expands and the elements 154 and 155 are thrown out of alignment and cause the throttle valve 152 to rotate clockwise toward closed position. Thus, where the manual lever 153 is turned to its extreme counter-clockwise position (tending to turn the throttle valve 152 to wide open adjustment) the servomotor 148—149 of the boost control will assume full control of the throttle valve 152, from wide open position (with the power bellows 149 fully contracted) to closed position (with the bellows fully extended). It will be clear, therefore, that where automatic control of the engine fuel supply and power output by the boost control is desired, the manual lever 153 will be kept in its extreme counter-clockwise adjustment, and the datum of the boost control may be varied at will by means of the lever 65 (Figure 5) so as to select any desired operating condition, in which case the manual lever 153 would only be resorted to in the event of failure of the boost control. Or, alternatively, the same device may be used for semi-automatic operation, simply by removing the lever 153 from its fully advanced (counter-clockwise) adjustment, and using the same lever 153 for direct manual operation of the throttle valve 152, in which case the boost control is confined to the role of a stand-by safety device which takes over control of the throttle valve automatically whenever certain preselected limits of manifold pressure or power output tend to be exceeded. Such limits may be varied by the pilot or operator by altering the datum of the boost control through the lever 65.

The device, as illustrated in Figure 7, is set for semi-automatic operation, with the lever 153 in intermediate adjustment so as to partly close the throttle valve. The manifold pressure thus obtained is lower than the value for which the boost control is set. Therefore, the pilot valve 148 is removed from its neutral position, and the power bellows 149 is inactive in its lowermost position. The pilot or operator may thus control the engine fuel supply directly by actuating the throttle valve from the manual lever 153 without any interference on the part of the boost control, so long as the power output of the engine is maintained within the limits for which he has set the lever 65. However, as soon as said limits are exceeded (as it may happen for instance where the throttle lever 153 is advanced too far, or the airplane descends to lower altitude), the increasing manifold pressure contracts the bellows 59 and determines movement of the pilot valve 148 to the opposite side of its neutral position so as to connect the power bellows 149 with the high pressure line 151, whereupon the bellows expands and closes the throttle valve 152 so as to decrease the engine fuel supply and maintain the engine power within the selected limits.

The engine 10' is further provided with a water injection device diagrammatically shown as forming part of the carburetor 102'. This device includes an admission pipe 157 connected with a source of pressure water or other suitable liquid or anti-detonating fluid, and a control member or valve 158 for regulating the admission of said water or fluid. The valve 158 is controlled by a lever 159 and is normally kept closed by a spring. A pin secured to lever 159 engages an elongated slot 160 formed at one end of a rod 161, the opposite end of which is connected to lever 99, thus providing a lost motion connection between the two levers. A calibrated orifice 162 is provided in the water conduit, together with a resilient bellows 163 enclosed in a housing and having one end secured thereto. The space within the bellows 163 and the chamber surrounding the same are connected with the upstream and downstream sides of orifice 162, respectively, whereby the differential pressure determined by the orifice when water is delivered to the engine causes the bellows to expand.

The free end of bellows 163 is connected with the lower end of a floating lever 164, the upper end of which is connected with an intermediate point of another floating lever 110'. The lower end of lever 110' is actuated by the manifold temperature responsive element 111, while the upper end thereof is actuated by an element 112' so arranged as to be responsive to changes of exhaust temperature as well as to changes of cylinder temperature. A median point of lever 164 is in turn connected with the lever 57 of the regulator. Another lever 165 is rotatably mounted on a pin carried by rod 161, and has its lower and upper ends connected with lever 101 and with the lower end of lever 164, respectively.

The regulator 53' operates as follows: when water is not supplied to the engine, the bellows 163 remains in contracted position as shown in Figure 7; and the levers 82, 92 and 99 control the compression ratio, the spark timing and the fuel-air ratio as functions of the adjustment of lever 65, the operation of the detonation detector 125, the manifold and exhaust pressures, the manifold, cylinder and exhaust temperatures and the engine speed.

When bellows 163 is in contracted position, the lever 101 is actuated by lever 99 through rod 161 and floating lever 165, the upper end of the last mentioned lever being substantially stationary. However, upon motion of rod 161 to the left of sufficient amplitude to take up the lost motion between pin and elongated slot 160, the lever 159 is caused to rotate counterclockwise against the load of the tension spring, thereby lifting valve 158 and admitting water to the engine; whereupon bellows 163 expands and moves the lower end of lever 164 to the left. This motion has a a twofold effect: on the one hand it causes counter-clockwise rotation of lever 165 and clockwise rotation of lever 101, thereby decreasing the fuel-air ratio. On the other hand it determines counter-clockwise rotation of lever 57 and of the warped cams, supplemented by further rotation in the same direction caused by the drop of operating temperatures accompanying the water injection.

If the water supply is exhausted, the bellows 163 contracts and moves the lower end of lever 164 back to the right; whereupon the lever 101 rotates counter-clockwise to increase the fuel-air ratio, and lever 57 is turned clockwise. Owing to the rotation of lever 57 caused by bellows 163, not only the fuel-air ratio but also the compression ratio of the ignition timing may be caused automatically to vary as water is delivered to the engine cylinders. Obviously, the extent of expansion of the resilient bellows 163 and the effects thereof are dependent upon the amount of water injected.

The general configuration of the warped cam 144 is such that axial motion thereof as caused by increase of manifold pressure (upward motion as seen in Figure 8) and/or rotation thereof as determined by increase of engine operating temperatures (clockwise rotation of lever 57 in Figure 7) cause clockwise rotation of lever 147 about its pin 146' and displacement of valve 148 toward the left. Where the lever 153 is in intermediate position, as shown in Figure 7, that is, for manual operation of the throttle valve 152, the bellows 149 remains inactive until valve 148 moves far enough to the left to connect the space within the bellows with the high pressure oil line 151. When this occurs bellows 149 expands, turns the throttle valve 152 clockwise and determines a decrease of boost or manifold pressure, thus causing bellows 59 to expand and shift cam 144 downward as seen in Figure 8. This motion of cam 144 causes displacement of valve 148 to the right, until the connection between the high pressure oil line 151 and bellows 149 is interrupted, whereupon expansion of the latter ceases. It is thus apparent that the device of Figures 7 and 8 automatically limits the manifold pressure to a maximum value which is a function of the various parameters or variables upon which the adjustments of cam 144 and cam 146 are dependent. With a warped cam 144 having the general configuration set forth above said boost limit increases upon counter-clockwise rotation of the pilot lever 65, decrease of exhaust pressure, and/or decrease of engine operating temperatures; and said boost limit decreases upon occurrence of detonation. Furthermore, for a given value of the engine operating temperatures the boost limit increases when water is supplied to the engine cylinders. The pilot lever 65 may be so set as to select various automatic regulations of the boost limit, corresponding for example to take-off rating admissible only for a few minutes, or to cruising operation. Where, on the other hand, the lever 153 is in fully advanced (or extreme counter-clockwise) adjustment, the boost control operates not only to prevent certain operating conditions from exceeding selected values, but is effective at all times to control the fuel flow so as to obtain automatically the schedule or program of operating conditions as selected by means of the datum-varying lever 65.

Figure 9 shows a fuel injection compression-ignition engine 10" provided with an exhaust-driven turbine 109 coupled with a supercharger 108 supplying air to the engine. A conventional gear-driven supercharger 106 may be provided in series between blower 108 and the engine cylinders.

The turbine 109 is controlled by means of an exhaust gate 170 which may be opened to discharge exhaust fluid directly to the atmosphere, thus to reduce the speed of supercharger 108. A servomotor 171 having a pilot valve 172 actuated by an induction pressure and temperature responsive bellows 173 controls the gate 170.

Fuel is supplied to the engine cylinders by an injection pump 174 driven from the engine through a slidable coupling 175 connected by means of straight and helical splines with the driving and driven pump shafts, respectively, whereby axial motion of the coupling sleeve 175 controls the timing of the intermittent fuel injection and in turn regulates the ignition timing. This coupling sleeve 175 carries diametrally opposed pins connected with one end of a lever 177 the median point of which is connected with a bi-metallic strip 179 surrounded by a coil 180 connected with the rate of cylinder pressure rise responsive device 125, the arrangement being such that upon increase of said rate of pressure rise the coupling is shifted to the left and retards the injection.

The regulator 53'' includes a shaft 54'' carrying three warped cams operating on the median points of three levers 183, 184 and 185. The shaft is axially positioned by means of a manual control member 65 and by only one resilient pressure-responsive bellows, no bi-metallic strip 121 being provided. The housing which encloses this single bellows is connected through a pipe 186 with a valve device 187 mounted on the head of one of the engine cylinders. This device includes a resiliently loaded valve element which opens when the cylinder pressure reaches its peak, thus maintaining within pipe 186 and the bellows housing a pressure which is substantially the same as the maximum cylinder pressure.

The angular adjustment of the warped cams is controlled through lever 57 by an exhaust temperature responsive element 189. The lower ends of levers 183, 184 and 185 have a pin and slot connection with three cams secured to shaft 85'' which is angularly adjusted by means of an engine-driven centrifugal device 89''. The upper ends of levers 183, 184 and 185 are connected with the injection timing lever 177, the compression ratio control lever 47 and the lower end of lever 181, respectively. Lever 181 is operated on by bellows 173 and is connected at its upper end with the pilot valve 172.

The adjustment of the pilot valve 172 as shown in Figure 9 is such as to admit high pressure oil from conduit 190 to the chamber on the right side of the power cylinder 171, so as to maintain the exhaust gate 170 closed. Upon increase of manifold pressure, and in the event that bellows 173 encloses fluid upon decrease of manifold temperature, the bellows contracts and moves the valve 172 to the left; and if the manifold pressure, or the density, exceeds a certain value, the valve 172 connects the chamber on the right of piston 171 with one of the oil drain lines while it admits pressure oil from conduit 190 to the opposite side of the piston, thus starting the servomotor in the direction to open the gate 170 which in turn determines deceleration of supercharger 108 and decrease of manifold pressure. Whereupon bellows 173 expands and displaces the valve 172 to the right until the latter attains its neutral position and stops the rotation of gate 170. It is thus clear that bellows 173 operates to control or to limit the manifold pressure or density to a maximum value dependent upon the adjustment of the lower end of lever 181; and that therefore this controlled or maximum value, the engine compression ratio and the injection timing are controlled by the regulator as preselected functions of the adjustment of manual lever 65, of the cylinder peak pressure, exhaust temperature and engine speed; and that furthermore the intermittent injection of fuel is retarded upon occurrence of engine knock.

These embodiments of the invention have been shown merely for purpose of illustration and not as a limitation of the scope of the invention. It is therefore to be expressly understood that the invention is not limited to the specific embodiments shown, but may be used in various other ways, with different types of engines, and that various changes, substitutions, additions and omissions may be made in the construction, arrangement and manner of operation of the parts and elements within the scope or limits of the invention as defined in the following claims. In particular, while the warped cams have been disclosed as slidable and rotatable, according to the invention they may have two other orders of adjustment, for example they may be reversibly slidable in two directions at right angles. It will be further appreciated by those skilled in the art that while means actuated upon changes of engine load have been specifically disclosed in connection with Figures 5 and 9 as induction pressure responsive bellows 59 and 173, respectively, other devices also actuated upon engine load variations may be substituted therefor; such for example as engine torque responsive means or hydraulic torque meters connected with the propeller reduction gear, which are well known in the art. The invention may obviously be applied not only to aircraft powerplants but also to any other suitable engine or prime mover. Certain features set forth herein are disclosed in my copending applications Serial No. 401,353, filed July 7, 1941, now Patent No. 2,378,036, and Serial No. 523,192, filed February 21, 1944, now Patent No. 2,378,037.

Where the claims are directed to less than all of the elements of the complete systems disclosed, they are intended to cover possible uses of the recited elements in installations which lack the non-recited elements:

I claim:

1. For a compression-ignition engine having fuel injection timing control means, a regulating device including means responsive to the rate of cylinder pressure rise adapted for connection with said timing control means to retard the injection for high values of said rate.

2. Engine control system including throttle regulating means; and engine operating pressure, temperature and speed responsive means and detonation detecting means for controlling said throttle regulating means to limit the maximum engine boost.

3. In an integrated engine regulating device, maximum boost control means; engine compression ratio control means; fuel-air ratio and anti-detonant injection control means; warped cam means reversibly adjustable in two distinct ways for the simultaneous and coordinate actuation of said control means; adjustable operative connections for actuating said control means from said cam means; means for modifying the adjustment of said operative connections with changes of engine speed; and means for altering the adjustment of said cam means in said two ways, including manual means, manifold pressure and temperature responsive means, exhaust pressure responsive means, and a detonation detector.

4. In a regulating system for an engine provided with water injection: first means for controlling the maximum boost; second means for controlling the fuel-air ratio; means for actuating said first and second means with changes of engine speed, manifold air temperature and exhaust back pressure; and means responsive to flow of injected water for operating on said first and second means to raise the maximum boost and lower the fuel-air ratio during water injection.

5. For use with an engine provided with an anti-detonant injection device: first means for controlling the engine boost; automatic means for actuating the first means to vary the maximum boost obtainable as a preselected function of engine speed, induction air temperature and exhaust back pressure; and means for raising the maximum boost obtainable while anti-detonant is being injected.

6. For use with an engine having an injection system for supplying water or other liquid to the engine: a regulating device including first means to control the engine fuel supply; engine operative pressure, temperature and speed responsive means connected with the first means for limiting the maximum engine fuel supply in preselected relation to said engine pressure, temperature and speed; and second means associated with the water injection system and connected with the first means to raise the limit of said maximum engine fuel supply while water is being supplied to the engine.

7. For a combustion engine having a supply system for delivering water or other liquid to the engine: means responsive to engine induction air pressure and temperature, to engine speed and to an additional temperature resulting from engine combustion to limit the maximum attainable engine fuel supply in predetermined relation to changes of said pressure, temperatures and speed; and means associated with said water supply system to raise the limit of said maximum engine fuel supply while water is being injected.

8. For use with an engine fuel supply system having mixture control means to vary the fuel/air ratio of the engine charge, an anti-detonant supply system including a flow passage and means providing a flow restriction therein; a regulating valve upstream of said restriction to meter the anti-detonant; manual and automatic means for actuating said regulating valve to control the engine supply of anti-detonant; and a pressure responsive device for actuating the mixture control means to decrease the fuel/air ratio in predetermined relation to the pressure drop across said flow restriction.

9. An integrated control for a supercharged engine including, in combination, a fuel feed system and first means associated therewith to alter the fuel/air ratio; second means to vary the engine ignition timing; third means to regulate the limit of maximum engine boost obtainable; an auxiliary fluid supply device; auxiliary fluid flow responsive means including pressure responsive means actuated by a differential pressure resulting from flow of said auxiliary fluid; and an operative connection between said flow responsive means and said first, second and third means to vary the fuel/air ratio, alter the ignition timing and change the limit of maximum engine boost obtainable in predetermined relation to the flow of said auxiliary fluid.

10. In an integrated control for supercharged engine, in combination, boost pressure regulating means; fuel/air ratio control means; ignition timing control means; an anti-detonant supply system; and means responsive to flow of anti-detonant and operatively connected with said boost pressure regulating means, fuel/air ratio control means and ignition timing control means to alter the maximum boost obtainable, the fuel/air ratio and the ignition timing while anti-detonant is being supplied to the engine.

11. For an engine having manifold pressure regulating means and a water or other liquid injection system, an automatic regulator including: a manually actuated control lever; first pressure responsive bellows, and a passage through which the first bellows may be subjected to engine manifold pressure; second pressure responsive bellows, and a passage through which the second bellows may be subjected to a pressure which tends to vary with changes of altitude; third pressure responsive means, and a passage through which the third means may be subjected to a pressure which increases upon occurrence of water injection; and power means under the control of said first and second pressure responsive bellows and third pressure responsive means for actuating the manifold pressure regulating means.

12. For use with an engine having an anti-detonant injection system, an automatic control device including: manifold pressure responsive means; additional pressure responsive means sensing changes of a pressure tending to vary with the altitude; third means actuated upon injection of anti-detonant; and power means controlled by said three means to control the engine fuel supply.

13. For use with an engine having an anti-detonant injection system, an automatic control including: engine manifold pressure responsive means; additional pressure responsive means sensing changes of a pressure which varies with the altitude; third means actuated upon anti-detonant injection; regulating means for controlling the engine fuel supply; and an operative connection including floating levers and a hydraulic power system to actuate said regulating means from said manifold pressure responsive means, additional pressure responsive means and third means.

14. For use with an engine having a combustion chamber, a system of passages leading combustion air to the combustion chamber and discharging combustion gases therefrom, a fuel supply system, and an injection system for supplying the engine with a fluid tending to lower engine operating temperatures under high load conditions; an automatic control device including: first pressure responsive means; a passage for connecting the first pressure responsive means with said system of passages; second pressure responsive means; a passage for subjecting said second means to a pressure tending to vary with the altitude; third pressure responsive means; a passage for subjecting said third means to a pressure which varies as said fluid is being injected; and power means controlled by said three pressure responsive means to regulate the engine fuel supply.

15. For a combustion engine having a manual control and an injection system operable under high engine load conditions to supply the engine with a liquid tending to lower engine operative temperatures, an automatic control device including: a control lever actuated from the manual control; engine operative pressure responsive means; engine operative temperature responsive means; and a control member actuated by said lever and pressure and temperature responsive means for controlling said injection system to bring about injection of said liquid under predetermined conditions of engine operative pressure, temperature and setting of the control lever.

16. For use with an engine having an air intake system and a water or other liquid injection system, a passage through which the water is supplied to the engine, flow restricting means in said passage, and differential pressure responsive means actuated by the differential pressure created by flow of water through said flow restricting means, an automatic engine control having: a pressure responsive bellows; a passage for connecting said bellows with said air intake system to subject the bellows at all times to the pressure therein; regulating means for altering the operative setting of the bellows; and an operative connection for actuating the regulating means from said differential pressure responsive means to modify the operative adjustment of the engine control during water injection.

17. For use with an engine having an anti-detonant injection system, a passage through which anti-detonant is supplied to the engine, flow restricting means in said passage, and pressure responsive means actuated by flow of anti-detonant through said flow restricting means, a fuel supply system including: fuel-air ratio regulating means, and an operative connection for actuating the fuel-air ratio regulating means from said pressure responsive means to decrease the fuel-air ratio in predetermined relation to the flow of anti-detonant which is being supplied to the engine.

18. For use with an engine having an ignition system, an anti-detonant injection system, and pressure responsive means sensing flow of anti-detonant as the latter is being supplied to the engine, an ignition timing apparatus including timing control means, and an operative connection for actuating the timing control means from said pressure responsive means to alter the ignition timing when anti-detonant is being injected.

19. Apparatus for controlling the fuel supply of a combustion engine having an air induction passage, a fuel supply system and an auxiliary fluid supply system; said apparatus comprising a power system for variably regulating the engine fuel supply; first pressure responsive means adapted for connection with said air induction passage to be constantly exposed to the pressure therein; second pressure responsive means for sensing changes of a pressure tending to vary with the altitude; third means actuated during actual supply of auxiliary fluid to the engine; and an operative connection between said first, second and third means and said power system for actuating the latter to alter the engine fuel supply automatically in predetermined relation to movements of said first, second and third means.

20. In a fuel supply system for an engine, in combination, engine fuel flow control means, an auxiliary charge fluid injection system for the engine, engine operating temperature responsive means, auxiliary fluid injection responsive means actuated upon injection of said auxiliary fluid, and connecting means actuating said fuel flow control means from said temperature responsive means and said auxiliary fluid injection responsive means to alter the engine fuel flow upon injection of said auxiliary fluid and in predetermined relation to changes of said temperature.

21. In a supercharged engine having an air induction system, in combination, a boost control including power means to regulate the pressure in a portion of said induction system; an anti-detonant injection system; anti-detonant injection responsive means; engine operating temperature responsive means; and connecting means between said temperature responsive means, said injection responsive means and said boost control for modifying the operative setting of said boost control to alter the pressure in said portion of the induction system upon injection of anti-detonant and in predetermined relation to changes of said temperature.

22. In a fuel feeding system for an engine, in combination, a mixture regulating device for varying the fuel-air ratio of the engine combustible mixture; an auxiliary fluid injection system; auxiliary fluid injection responsive means; engine operating temperature responsive means; and connecting means between said injection responsive means, said temperature responsive means and said mixture regulating device to alter the fuel-air ratio upon injection of auxiliary fluid and in predetermined relation to variations of said temperature.

23. A fuel supply system for an engine having an air induction system and an auxiliary fluid injection system, including: fluid injection responsive means; temperature responsive means adapted for connection to a portion of the engine air induction system; and fuel-air ratio regulating means connected to be actuated by said fluid injection responsive means and temperature responsive means for altering the fuel-air ratio upon injection of auxiliary fluid and varying said ratio as a preselected function of said temperature.

24. Apparatus for use with an internal combustion engine including an intake manifold, comprising a source of anti-knock fluid, a conduit for connecting said source to said engine, a metering valve in said conduit, a floating lever having one portion connected to said valve, a temperature responsive element connected to another portion of said lever, and a pressure sensitive element responsive to absolute pressure in said manifold also connected to said lever.

25. Apparatus as defined in claim 24, comprising in addition an aneroid capsule connected to said pressure responsive element to affect the operation thereof.

26. Apparatus for controlling the intake pressure of a supercharged engine including a member for actuating a throttle valve in the engine induction passage; a servomotor for operating said member; a device responsive to pressure tending to vary with the altitude; a device responsive to the temperature of the engine operating medium; a pressure responsive device connected to a passage through which a liquid is injected into the engine, which device is actuated by certain pressure variations of said liquid; a manually positioned part; and an operative connection between said devices, said part and said servomotor to actuate the servomotor.

27. Apparatus for controlling the intake pressure of an engine including a member for actuating a throttle valve in the engine induction system, a servomotor for operating said member, a device responsive to a pressure tending to vary with the altitude, a device responsive to the temperature of the engine operating medium, a device responsive to engine intake pressure, a device responsive to certain pressure variations of a liquid injected into the engine, and means under control by said devices for controlling the servomotor.

28. Apparatus for controlling the intake pressure of a supercharged engine, including a member for actuating a throttle valve in the engine induction system, a servomotor for operating said member, a device responsive to engine intake pressure, a device responsive to the temperature of the engine operating medium, a pressure responsive device adapted for connection with a passage through which a liquid is injected into the engine and actuated upon certain pressure variations in said passage, and means under control by said devices for controlling the servomotor.

29. Apparatus for controlling the intake pressure of a supercharged engine, including a reversible servomotor operating to increase or decrease the engine intake pressure, a device responsive to variations in the temperature of the engine operating medium, a pressure responsive device connected with a passage through which a liquid under pressure is supplied to the engine, and means under control by said devices for controlling the servomotor.

30. In a supercharged engine, in combination, a manifold pressure regulator having datum-changing means, an ignition system having ignition timing regulating means, an anti-detonant injection system, anti-detonant injection sensing means, and an operating connection between said injection sensing means, said datum-changing means and said timing regulating means for increasing the maximum value of manifold pressure obtainable by said manifold pressure regulator and modifying the ignition timing during injection of anti-detonant.

31. In combination with an engine having an intake manifold, a manifold pressure regulator having datum changing means; a fuel supply system having fuel-air ratio varying means; an auxiliary charge injection system for supplying an auxiliary charging fluid to the engine, having fluid injection control means; a manually operable member; a manifold pressure responsive device; means for connecting the manually operable member and the manifold pressure responsive device to said fluid injection control means for rendering the operation of said injection system dependent upon the setting of said member and the attainment of predetermined manifold pressure; and means becoming effective during injection of said auxiliary charging fluid to the engine to actuate said datum changing means and said fuel-air ratio varying means.

32. In an engine, in combination, a fuel supply system having fuel-air ratio varying means, an ignition system having ignition timing changing means, an auxiliary fluid injection system, and fluid injection responsive means connected to said ratio varying means and timing changing means to alter said fuel-air ratio and said ignition timing when said auxiliary fluid is injected.

33. A control system for an engine, said system comprising a valve for controlling the engine intake air, a member movable to vary the position of said valve, regulating means automatically responsive to changes in the engine intake air pressure for moving said member to maintain a predetermined engine intake air pressure, a three dimensional cam movable to set the pressure maintained by said regulating means, means connecting said member to said cam for moving said cam along one path in response to movements of said member, and manually operable means for moving said cam along another path.

34. A control system for an engine, said system comprising a valve for controlling the engine intake air, a member movable to vary the position of said valve, regulating means automatically responsive to changes in the engine intake air pressure for moving said member, a first three dimensional cam movable to determine the pressure maintained by said regulating means, means connecting said member to said cam for moving said cam along one path in response to movements of said member, manually operable means for moving said cam along another path, and a second three dimensional cam movable with said first cam for controlling the rate at which an anti-detonant is introduced into said engine.

35. A control system for an engine; said system comprising regulating means automatically operable to maintain a condition indicative of engine torque at a predetermined value, said regulating means including means adjustable to determine the magnitude of said predetermined value; a three dimensional cam movable for positioning said adjustable means; manually operable means for moving said cam along one path; and means for moving said cam along another path.

36. A control system for an engine having a member movable to vary the power output of said engine; said system comprising regulating means operatively connected to said member and automatically operable to move said member to maintain a predetermined engine power output, said regulating means including means adjustable to determine the magnitude of power output maintained by said regulating means; a three dimensional cam movable for positioning said adjustable means; manually operable means for moving said cam along one path; and means for moving said cam along another path.

37. A control system for an engine, said system comprising a valve for controlling the engine intake air, a member movable to vary the position of said valve, regulating means automatically responsive to changes in the engine intake air pressure for moving said member to maintain a predetermined engine intake air pressure, a three dimensional cam movable to set the pressure maintained by said regulating means, means for automatically moving said cam along one path, and manually operable means for moving said cam along another path.

38. Apparatus for supplying an auxiliary charge of water or other suitable liquid to an internal combustion engine having an induction passage and means for supplying fuel thereto, comprising a source of said liquid, a conduit for connecting said source to the engine, a metering valve in said conduit controlling the supply of said liquid to the engine, and control means for said valve comprising a temperature responsive member subject to temperature changes in said induction passage, a pressure responsive member subject to pressure variations in said induction passage, and means connecting said temperature responsive member and said pressure responsive member to said control valve.

39. In combination with a combustion engine having a system of ducts leading combustion air thereto and exhausting combustion products therefrom, and means for supplying fuel to the engine, an auxiliary charge injection system for supplying water or other suitable liquid to the engine including a flow passage having a metering valve therein, pressure responsive means operatively connected to actuate said metering valve, and conduit means for connecting said pressure responsive means with different portions of said system of ducts.

40. For use with a supercharged engine having an air induction system and a device for supplying a primary fuel to the engine, an auxiliary charge injection system for supplying water or other suitable liquid to the engine under predetermined operating conditions, including a flow passage having a metering valve therein, pressure responsive means connected to said valve, conduit means for connecting said pressure responsive means to said induction system, and means for modifying the action of said pressure responsive means as a function of the temperature in a portion of said induction system.

41. In an engine having a fuel supply system, fuel rate control means, and an injection system for supplying the engine with water or other suitable liquid to lower engine temperature level: first means actuated in response to injection of said liquid; second means responsive to changes of an engine temperature dependent upon fuel rate and upon injection of said liquid; and an operative connection for actuating said fuel rate control means from said first and second means.

42. An engine fuel supply system having fuel rate control means; an injection system for supplying an auxiliary charge of water or other liquid to the engine to lower the temperature level thereof; temperature responsive means for sensing an engine operating temperature which is dependent upon both the rate of engine fuel supply and the injection of said liquid; and an operative connection for actuating said fuel rate control means from said temperature responsive means.

43. In a regulating device for a prime mover, the combination of control means for regulating the rate of fuel supply to the prime mover, control means arranged to be responsive to change of speed of said prime mover, control means arranged to be responsive to manual supervision, control means arranged to be responsive to changes of temperature in a portion of said prime mover, control means arranged to be responsive to changes of air pressure affecting prime mover operation, and means including a floating lever connected at various points with said control means for interconnecting all of said control means.

44. In a regulating mechanism for a power plant, the combination of control means for regulating the rate of fuel flow to said power plant, control means for regulating the speed of said power plant, control means arranged to be responsive to manual supervision, control means arranged to be responsive to changes of temperature in a portion of said power plant, control means arranged to be responsive to variations of pressure in a portion of said power plant, and means including a floating lever connected at different points with said control means for operatively interconnecting all of said control means.

45. In regulating apparatus for a powerplant including an operating medium supply system, the combination of control means for regulating the supply of said operating medium to the powerplant, temperature responsive means sensing variations in a temperature condition appurtenant to the operation of the powerplant for modifying the action of said control means to prevent excessive temperatures, additional liquid supply means for feeding an auxiliary charge to said powerplant to secure extra power, and means becoming effective upon operation of said liquid supply means for altering the action of said temperature responsive means to permit emergency operation at temperatures above the normal limit.

46. Engine regulating apparatus comprising in combination a fuel supply system, fuel control means for regulating the engine fuel supply, temperature responsive means sensing engine temperature for operating on said fuel control means to reduce the fuel supply upon a predetermined increase of engine temperature, a liquid injection system for supplying the engine with an additional charge, and means actuated in response to operation of said liquid injection system for automatically varying the range setting of said temperature responsive means.

47. Engine regulating apparatus comprising in combination control means for variably regulating a plurality of engine operating conditions affecting engine temperature level, temperature responsive means sensing engine temperature and operatively connected to said control means for modifying the operation thereof to prevent excessive engine temperatures, a liquid injection system for supplying the engine with an auxiliary charge, and means effective upon operation of said injection system for altering the action of said temperature responsive means.

FERDINANDO CARLO REGGIO.

References Cited in the file of this patent

UNITED STATES PATENTS

| Number | Name | Date |
|---|---|---|
| Re. 18,671 | Goode | Nov. 29, 1932 |
| 795,422 | Thompson | July 25, 1905 |
| 891,638 | Scholes et al. | June 23, 1908 |
| 1,109,681 | Judson | Sept. 8, 1914 |
| 1,174,459 | Winckler | Mar. 7, 1916 |
| 1,211,636 | Spray | Jan. 9, 1917 |
| 1,664,718 | Williams | Apr. 3, 1928 |
| 1,794,047 | Woolson | Feb. 24, 1931 |
| 1,838,408 | King et al. | Dec. 29, 1931 |
| 1,904,936 | Stokes | Apr. 18, 1933 |
| 1,933,990 | McGrath et al. | Nov. 7, 1933 |
| 1,941,342 | Dyer | Dec. 26, 1933 |
| 1,954,163 | Woolson | Apr. 10, 1934 |
| 2,088,954 | Gregg | Aug. 3, 1937 |
| 2,142,466 | Wagner | Jan. 3, 1939 |
| 2,145,017 | Tsuneda | Jan. 24, 1939 |
| 2,174,526 | Parker | Oct. 3, 1939 |
| 2,220,558 | Van Dijck et al. | Nov. 5, 1940 |
| 2,281,411 | Campbell | Apr. 28, 1942 |
| 2,297,213 | Gosslaw et al. | Sept. 29, 1942 |
| 2,313,264 | Reggio | Mar. 6, 1943 |
| 2,336,844 | Buck | Dec. 14, 1943 |
| 2,392,565 | Anderson | Jan. 8, 1946 |
| 2,396,618 | Stieglitz et al. | Mar. 12, 1946 |
| 2,401,563 | Hersey | June 4, 1946 |
| 2,407,652 | Costa | Sept. 17, 1946 |
| 2,443,465 | Leibing | June 15, 1948 |
| 2,491,482 | Dolza et al. | Dec. 20, 1949 |
| 2,491,497 | Jorgensen et al. | Dec. 20, 1949 |

FOREIGN PATENTS

| Number | Country | Date |
|---|---|---|
| 280,506 | Great Britain | July 19, 1928 |